Feb. 11, 1969     P. PLESKA     3,426,620

WHEEL DRIVE

Filed April 19, 1966

INVENTOR.
Paul Pleska
BY
R. L. Phillips
ATTORNEY

United States Patent Office 3,426,620
Patented Feb. 11, 1969

3,426,620
WHEEL DRIVE
Paul Pleska, Lyndhurst, Ohio, assignor to General Motors Corporation, Detroit, Mich., a corporation of Delaware
Filed Apr. 19, 1966, Ser. No. 543,695
U.S. Cl. 74—705        4 Claims
Int. Cl. F16h 37/06; B60k 17/16

ABSTRACT OF THE DISCLOSURE

A wheel drive comprising a pair of gear sets is housed in a rotary wheel hub. The gear sets cooperatively provide one speed reduction drive and one gear set provides another speed reduction drive having less speed reduction with both drives established by clutch engagement accomplished by movement of an annular gear member of one of the gear sets.

---

This invention relates to a wheel drive and more particularly to a multi-ratio wheel drive.

The wheel drive according to this invention is embodied in a gear arrangement fully housed in a rotary wheel hub and comprising an inboard and an outboard gear set; each gear set having an external toothed gear, an internal toothed ring gear and a carrier having pinions meshing with the former gears. Both external toothed gears are connected to be driven by an axle-drive shaft; the carrier of the inboard gear set is connected to a stationary wheel spindle supporting the wheel hub to provide fixed speed reduction in this gear set and the carrier of the outboard gear set is connected to the wheel hub. A servo mounted on the grounded inboard carrier is connected to operate the inboard ring gear from a position in which no drive is transmitted to a position of dog clutch engagement with the outboard ring gear to compound the action of both gear sets to provide a low speed ratio drive and to a position of dog clutch engagement with the rotary wheel hub to provide a high speed ratio drive.

An object of this invention is to provide a pair of integrated gear sets each having an input gear in the drive path it provides, one gear set having a grounded carrier in its drive path to provide fixed speed reduction in this gear set, the other gear set having an output carrier in its drive path and the one gear set having a ring gear for driving a ring gear in the other gear set and for driving the output.

Another object of this invention is to provide a wheel drive having a pair of integrated gear sets each having an axle-drive shaft driven input gear in the drive path it provides, one of the gear sets providing fixed speed reduction by having a carrier in its drive path grounded to a dead wheel spindle, the other gear set having a carrier in its drive path connected to the driven wheel hub and the one gear set having a ring gear movable from a position in which the wheel hub is disconnected from the shaft to a position of dog clutched engagement with the other ring gear to provide a low speed ratio drive and to a position of dog clutched engagement with the wheel hub to provide a high speed ratio drive.

These and other objects of the invention will be more apparent from the following description and drawing in which.

Figure 1:
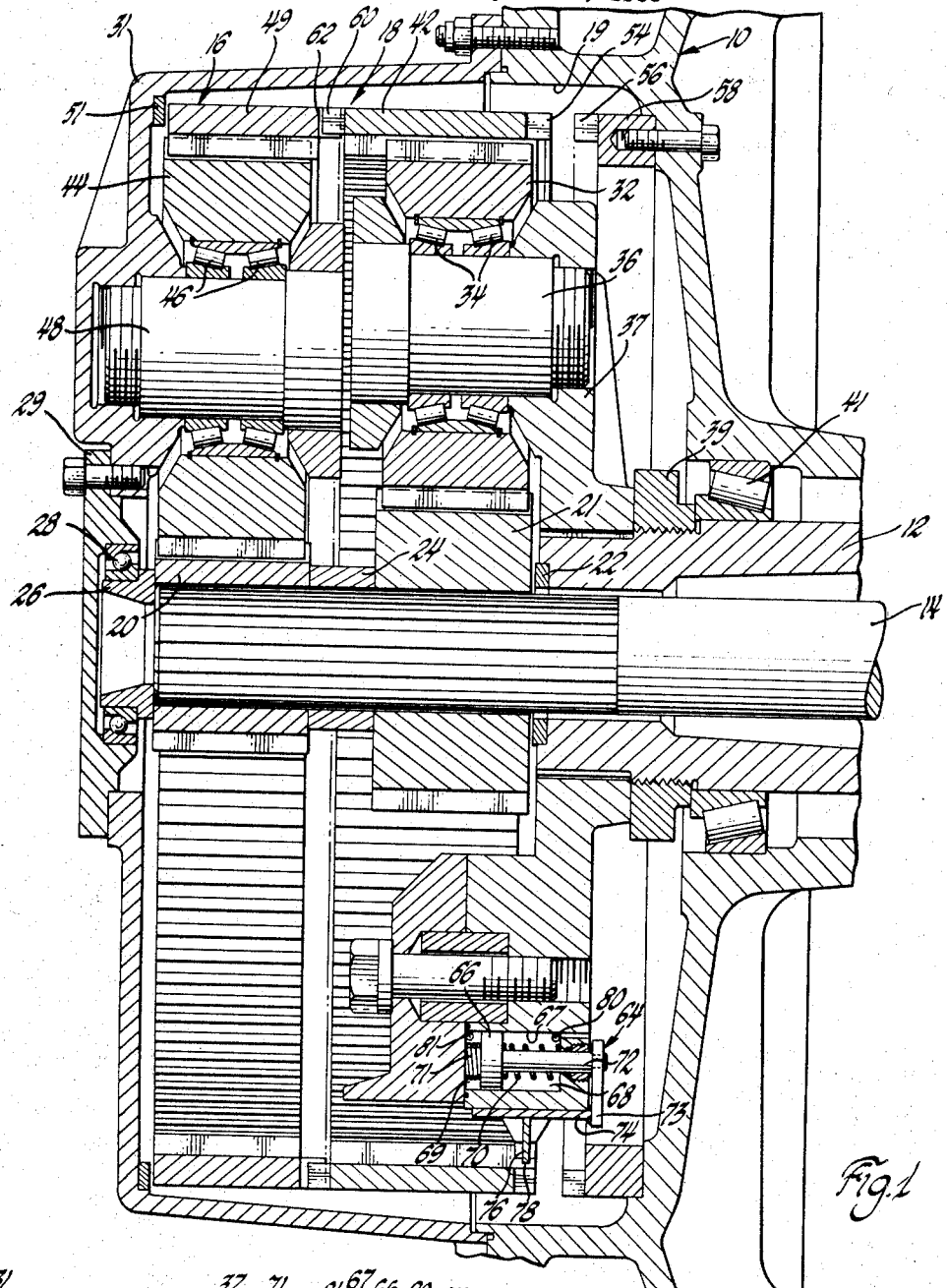
FIGURE 1 is a longitudinal view, with parts in section, of the preferred embodiment of the wheel drive and shows low speed ratio drive engaged.

Referring to FIGURE 1, numeral 10 generally denotes a tire supporting wheel hub which is rotatably mounted on the stationary or dead wheel spindle 12 of a heavy duty vehicle and connected to be driven by an axle-drive shaft 14 through a gear unit comprised of the pair of gear sets 16 and 18. For the purpose of simplifying the description of the wheel drive structure as applied to a heavy duty vehicle, only one wheel drive structure has been shown. It will be understood that an identical wheel drive is provided for each drive shaft in the actual vehicle construction which may be assumed as having a pair of drive shafts driven through a differential unit and a transmission by the vehicle's engine.

Both gear sets 16 and 18 are located within the outer diameter of hub cavity 19. The drive shaft 14 extends past the outboard end of spindle 12 and is splined to an external toothed gear 20 of the outboard gear set 16 and an external toothed gear 21 of the inboard gear set 18. A thrust ring 22 on the outboard end of spindle 12 takes the rightward thrust of gear 21 and a sleeve 24 on shaft 14 spaces gears 20 and 21. The gear 20 is located against a thrust collar 26 rotatably supported by an antifriction ball bearing assembly 28 on an end plate 29 which is bolted to a cover plate 31. Cover plate 31 is bolted to the rotary wheel hub 10 and serves as a drive connection between the gear unit and the wheel hub in addition to covering and protecting the gear sets as will be described in greater detail later.

The gear 21 meshes with pinions 32 supported by antifriction roller bearings 34 on pinion spindles 36 which are threaded to a carrier 37. Carrier 37 is splined to the stationary spindle 12 and is thus grounded to provide fixed speed reduction in gear set 18. A collar 39 threaded to spindle 12 prevents inboard movement of carrier 37 and also retains an antifriction roller bearing 41 in place, bearing 41 supporting the rotary wheel hub 10 on the wheel spindle 12. The pinions 32 mesh with the internal teeth of a control ring gear 42 which is capable of axial movement as will be discussed in greater detail later.

The gear 20 meshes with pinion 44 supported by antifriction roller bearings 46 on pinion shafts 48 which are threaded to cover 31 and thus rigidly connected to wheel hub 10. The pinions 44 mesh with the internal teeth of a ring gear 49 whose leftward thrust is taken by a thrust ring 51 secured to cover 31.

Figure 2:
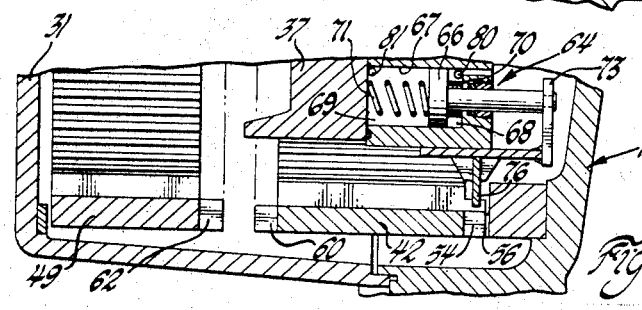
FIGURE 2 is a partial view similar to FIGURE 1 and shows high speed ratio drive engaged.

The wheel drive is capable of providing two reduction drives and a neutral condition in which no drive is transmitted. The selective operating condition is established by controlling the control gear provided by ring gear 42 of the inboard gear set 18 which ring gear is an axially movable internal spur gear and has dogs 54 on its inboard side engageable, as shown in FIGURE 2, with dogs 56 provided on a ring member 58 bolted to the rotary wheel hub 10 to provide one reduction drive, the dogs 54 and 56 providing drive establishing means for establishing this drive. Ring gear 42 also has dogs 60 on its outboard side engageable, as shown in FIGURE 1, with dogs 62 provided on the inboard side of ring gear 49 to provide the other reduction drive, the dogs 60 and 62 providing drive establishing means for establishing this drive. The tooth width of ring gear 42 is wider than pinions 32 to maintain full pinion tooth contact during the dog clutch engagements. The axial dimensions of the engageable dogs are determined so that when the ring gear 42 is in a central or neutral position none of the dogs are engaged.

A hydraulic servo 64 mounted on the grounded carrier 37 is provided for selectively effecting axial movement of the ring gear 42 for the dog clutch engagement and neutral and comprises a piston 66 mounted in a bore 67 in carrier 37 running parallel to the axis of ring gear 42. The piston 66 divides the bore, which is closed at both ends, into a low apply chamber 68 and a high apply chamber 69. Springs 70 and 71 mounted in the chambers 68 and 69, respectively, normally bias the piston to a mid-position in the bore. A rod 72 rigidly connected to piston 66 extends through and is sealed in an aperture at the right end of bore 67 and is connected at its inboard end by an arm 73 and a bracket 74 to a finger 76 fit in a slot 78 in ring gear 42. A low apply line 80 and a high apply line 81 are connected to the low apply chamber 68 and the high apply chamber 69, respectively, and these lines are connected by a suitable manual selector valve (not shown) to supply fluid at a regulated pressure to one chamber while exhausting the other chamber and also to exhaust both chambers. When both chambers are exhausted, ring gear 42 is held in its neutral position by springs 70 and 71 to disengage all the dogs to disconnect the wheel hub from the drive shaft. On supply of fluid under pressure to low apply chamber 68 and exhaust of high apply chamber 69 ring gear 42 is moved by the servo from neutral to the left to the position shown in FIGURE 1 engaging dogs 60 with dogs 62 so that ring gears 42 and 49 are clutched or connected. On converse fluid supply and exhaust, ring gear 42 is moved by the servo from neutral to the right to the position shown in FIGURE 2 to engage the dogs 54 with the dogs 56 so that the ring gear 42 is clutched or connected to the rotary wheel hub 10.

*Operation*

The ring gears 42 and 49 are connected by the proper servo operation when power to the drive shaft is interrupted to relieve ring gear 42 of load to easily permit the dog clutch engagement. This operation establishes the low speed ratio drive in which the output carrier or cover 31 and connected wheel hub 10 are driven in a direction opposite the now powered driving shaft 14 and at a reduced speed relative thereto by the compound action of both gear sets since the carrier 37 is grounded providing fixed speed reduction in gear set 18 and both gears 20 and 21 are driving. The low speed ratio drive provides the highest torque multiplication and the highest ratio of speed reduction which can be expressed by the equation $$\frac{\text{Shaft 14 speed}}{\text{wheel hub 10 speed}} = \frac{1}{\frac{T_{49}+1}{T_{20}} \cdot \frac{T_{42}}{T_{21}}\left(\frac{T_{20}+1}{T_{49}}\right)}$$

where $T_{\text{numeral subscript}}$=number of teeth on the gear designated by the numeral subscript.

For the high speed ratio drive the ring gears 42 and 49 are disconnected by the servo 64 on interruption of the power to the drive shaft 14 and during this power interruption the servo is then operated to dog the ring gear 42 to the rotary hub 10 through engagement of the dogs 54 and 56. Since the carrier 37 is grounded providing fixed speed reduction in gear set 18, the ring gear 42 acts as the output to drive the wheel hub 10 in the direction opposite the now powered driving shaft 14 like in low drive and at a reduced speed relative thereto and in a speed range higher than that provided in the low speed ratio drive to provide smaller speed reduction and torque multiplication. The ratio of speed reduction in high drive can be expressed by the equation $$\frac{\text{Shaft 14 speed}}{\text{wheel hub 10 speed}} = \frac{T_{42}}{T_{21}}$$

where $T_{\text{numeral subscript}}$=number of teeth on the gear designated by the numeral subscript.

Since both gear sets 16 and 18 are mounted outboard of the wheel hub 10 they may be easily removed or inspected for service by unbolting the cover plate 31. In addition, it is possible to obtain large speed ratios of reduction especially in the low range with the compact integration of the gear sets provided.

The above described preferred embodiment is illustrative of the invention which it will be appreciated may be modified within the scope of the appended claims.

I claim:

1. In a drive unit the combination of an input member; an output member; a gear unit including drive establishing means operatively connected to said members operable on engagement of said drive establishing means to provide a speed ratio drive between said members; said gear unit also including a control gear operatively connected to said drive establishing means operable to engage and disengage said drive establishing means; said gear unit also including a first gear set having an external toothed gear connected to said input member, a ring gear, and a carrier having a pinion meshing with said external toothed gear and ring gear connected to said output member; said gear unit also including a second gear set having an external toothed gear connected to said input member, a ring gear providing said control gear, and a stationary carrier having a pinion meshing with said external toothed gear and ring gear; said drive establishing means including clutch means for clutching said ring gears; said ring gear of said second gear set being movable on said pinion of said second gear set to engage and disengage said clutch means; and clutch means operable to clutch said ring gear of said second gear set and said output member to provide another speed ratio drive between said members; said ring gear of said second gear set being movable to engage and disengage the last mentioned said clutch means.

2. In a wheel drive unit the combination of a stationary wheel spindle; a wheel hub rotatably mounted on said spindle; a drive shaft extending through said spindle; a gear unit including drive establishing means operatively connected to said drive shaft and said wheel hub operable on engagement of said drive establishing means to provide a speed ratio drive between said drive shaft and said wheel hub; a control gear in said gear unit operatively connected to said drive establishing means operable to engage and disengage said drive establishing means; said gear unit also including a first gear set having an external toothed gear connected to said drive shaft, a ring gear, and a carrier having a pinion meshing with said external toothed gear and ring gear connected to said wheel hub; said gear unit also including a second gear set having an external toothed gear connected to said drive shaft, a ring gear providing said control gear, and a carrier having a pinion meshing with said external toothed gear and ring gear connected to said spindle; said drive establishing means including clutch means for clutching said ring gears; said ring gear of said second gear set being axially movable on said pinion of said second gear set to engage and disengage said clutch means; clutch means operable to clutch said ring gear of said second gear set and said wheel hub to provide another speed ratio drive between said drive shaft and said wheel hub; and said ring gear of said second gear set being movable to engage and disengage the last mentioned said clutch means.

3. The wheel drive unit set forth in claim 2 and each said clutch means being a dog clutch.

4. The wheel drive unit set forth in claim 2 and operating means mounted on said carrier of said second gear set and operatively connected to said ring gear of said second gear set operable to move said ring gear of said second gear set to engage and disengage both said clutch means.

References Cited

UNITED STATES PATENTS

| | | | |
|---|---|---|---|
| 995,552 | 6/1911 | Osborn | 74—785 X |
| 1,228,472 | 6/1917 | Olson | 74—391 X |
| 1,414,894 | 5/1922 | Phillips | 74—705 |
| 1,417,798 | 5/1922 | Cook et al. | 180—433 X |
| 2,331,684 | 10/1943 | Henningsen | 74—785 |
| 2,907,229 | 10/1959 | Mueller | 74—674 |
| 3,184,994 | 5/1965 | Stahl | 74—674 |
| 3,273,421 | 9/1966 | Jones | 74—705 |

FOREIGN PATENTS 712,527 10/1941 Germany.

DONLEY J. STOCKING, *Primary Examiner.*

THOMAS C. PERRY, *Assistant Examiner.*

U.S. Cl. X.R.

180—75